United States Patent [19]
Rostoker, deceased et al.

[11] Patent Number: 5,180,421
[45] Date of Patent: Jan. 19, 1993

[54] METHOD AND APPARATUS FOR RECOVERING USEFUL PRODUCTS FROM WASTE STREAMS

[75] Inventors: William Rostoker, deceased, late of Homewood, Ill., by Gareth Rostoker, executor; Gareth Rostoker, Glenwood, Ill.; Julius J. Bonini, Munster, Ind.; Gary W. Klimczak, Lemont, Ill.

[73] Assignee: Rostoker, Inc., Burnham, Ill.

[21] Appl. No.: 667,107

[22] Filed: Mar. 11, 1991

[51] Int. Cl.⁵ .............................................. C22B 1/16
[52] U.S. Cl. ..................................... 75/414; 75/323; 75/759
[58] Field of Search .......................... 75/414, 323, 759

[56] References Cited

U.S. PATENT DOCUMENTS

| | | | |
|---|---|---|---|
| 3,003,864 | 10/1961 | Kraner | 75/759 |
| 3,311,465 | 3/1967 | Ban | 75/759 |
| 4,209,421 | 6/1980 | Heimerl et al. | 252/301.1 |
| 4,376,070 | 3/1983 | Pope et al. | 252/629 |
| 4,395,367 | 7/1983 | Rohrmann et al. | 252/629 |
| 4,793,993 | 12/1988 | Rostoker et al. | 210/710 |
| 4,922,841 | 5/1990 | Kent | 110/346 |

OTHER PUBLICATIONS

Freeman, H., Innovative Thermal Hazardous Organic Waste Treatment Processes, pp. 44-54, Noyes Publications, Park Ridge, N.J. (1985).
Recycling Electric Arc Furnace Emission Control Dust, The Hazardous Waste Consultant, pp. 1-13 to 1-18, Mar./Apr. Volume, (1990).

Primary Examiner—Peter D. Rosenberg
Attorney, Agent, or Firm—Rockey and Rifkin

[57] ABSTRACT

Waste materials containing metal oxides and/or metals and their salts are converted to useful products. The waste materials are combined in such proportions that when heated, they form a composite that becomes molten and pourable at temperatures below about 1600° C. Provision is also made for converting some of the metal oxides in the molten material to free metal which is then separated from the molten material. A modified cupola can be used to generate the temperature and reducing conditions suitable for carrying out the process.

29 Claims, 2 Drawing Sheets ns. 5,180,421

METHOD AND APPARATUS FOR RECOVERING USEFUL PRODUCTS FROM WASTE STREAMS

FIELD OF THE INVENTION

The present invention relates generally to the field of chemical waste disposal and, more particularly, to a process adapted for treating waste streams containing metals and metallic compounds and for recovering useful products therefrom.

BACKGROUND OF THE INVENTION

A number of solid hazardous and solid waste materials are produced by municipalities and industries each day. These include such diverse materials as municipal incinerator bottom ash, hazardous waste incinerator bottom ash, bag house or precipitator dust, steel plant dust, electroplating sludges, electrochemical machining sludges, waste foundry sands, dried and decontaminated sewage solids and coal combustion fly ash. In the past, such solid materials have been disposed of largely in landfills. Because of the potential scarcity of landfills, there is continual pressure to find other means for disposing of such wastes. Furthermore, many of the solid wastes contain one or more minor amounts of metals and metal oxides which are considered hazardous and thereby the whole of the solid waste is classified as hazardous.

Some of the waste materials contain appreciable amounts of valuable metals or oxides of such metals. These represent an important resource for the country if they can be recovered from the waste materials in a useful form.

For the foregoing reasons, there is a growing need to find useful applications for the waste streams. There is also a need to convert the hazardous materials into a form in which they are insoluble in ground water and pose no threat to the environment.

A number of workers have disclosed methods for disposing of waste containing radioactive substances. For example, U.S. Pat. Nos. 4,209,421 and 4,376,070 incorporate the radioactive waste in glass-forming material which forms a glass around the radioactive waste. In U.S. Pat. No. 4,395,367, a metal oxide, such as lead oxide, and a reducing agent are also mixed with the glass forming agent. After melting, the mixture separates into a glass phase containing the radioactive material and a metal phase obtained by reducing the metal oxide. The metal phase contains certain noble metals that can be recovered from the waste.

Two glass melters are described in Freeman, *Innovative Thermal Hazardous Organic Waste Treatment Processes*, pp. 44–54, Noyes Publications, Park Ridge, N.J. (1985). Waste streams are heated in a furnace containing molten glass. Noncombustibles mix with the glass which encapsulates the waste material when it solidifies.

A complex apparatus which combines oxidizers and other treatment chambers in series with a rotary kiln is disclosed in U.S. Pat. No. 4,922,841. This is said to be useful in treating hazardous waste in a combustion process. Some of the solid residue is recovered as aggregate said to be non-hazardous and some forms a clinker.

A recent patent, U.S. Pat. No. 4,793,933 issued to the assignee of the present application, discloses a method for treating metal hydroxide electroplating sludges. In this disclosure, the sludges are first converted to metal oxides by heating. The mixture is further heated with quantities of silica and soda to cause fusion of the mixture with formation of a slag having the metal oxides in chemical solution. Optionally, some of the metal oxides were reduced to free metal which separated from the slag.

We have now discovered that waste streams of diverse origins can be blended in special formulations that form a solution of oxides on heating. This solution, after cooling, forms a solid having a number of commercial uses. This process represents a distinct improvement over prior methods that require addition of extraneous glass or glass forming materials to the waste stream. Furthermore, the method provides for the recovery or recycling of various metals found in the waste streams.

SUMMARY OF THE INVENTION

In accordance with the invention, there is provided a method for recovering useful materials from waste streams comprising the steps of:

(a) mixing a plurality of waste streams in such proportions that the amounts of the combined A, B and C components of the mixture are within the area enclosed by lines joining points a, b, C, g and h in FIG. 1 and that they form a composite that becomes molten and pourable below about 1600° C.;

(b) heating the mixture obtained in step (a) to a temperature sufficient to cause fusion thereof to form a molten and pourable solution of oxides; and (c) cooling said solution of oxides to form a stable solid, wherein A is the sum of the percentages by weight of the sodium, potassium, calcium, barium, boron and phosphorus compounds in the mixture measured as their oxides, wherein B is the sum of the percentages by weight of the silicon and aluminum compounds in the mixture measured as their oxides, and wherein C is the sum of the percentages by weight of the iron, copper, nickel, cobalt, zinc, lead, titanium, manganese, cadmium, vanadium, arsenic, magnesium, chromium, tin, tantalum, silver and zirconium compounds in the mixture measured as their oxides.

Also provided in accordance with this invention, is a method for processing a plurality of waste streams of variable composition comprising the steps of:

(a) separately receiving each of said waste streams;

(b) analyzing each waste stream to determine the amount of its A, B and C components;

(c) comminuting the large particles in said waste streams to a size that permits intimate mixing of said waste streams;

(d) mixing said waste streams in such proportions that the amounts of the combined A, B and C components of the mixture are within an area enclosed by lines joining points a, b, C, g and h in FIG. 1 and that they form a composite that becomes molten and pourable below about 1600° C.;

(e) heating the mixed streams from step (d) to produce a molten and pourable solution of oxides; and (f) solidifying the solution of oxides to form a stable solid, wherein A is the sum of the percentages by weight of the sodium, potassium, calcium, barium, boron and phosphorus compounds in the mixture measured as their oxides, wherein B is the sum of the percentages by weight of the silicon and aluminum compounds in the mixture measured as their oxides, and wherein C is the sum of the percentages by weight of the iron, copper, nickel, cobalt, zinc, lead, titanium, manganese, cadmium, vanadium, arsenic, magnesium, chromium, tin, tantalum, silver and zirconium compounds in the mixture measured as their oxides.

DETAILED DESCRIPTION OF THE INVENTION

Figure 1:
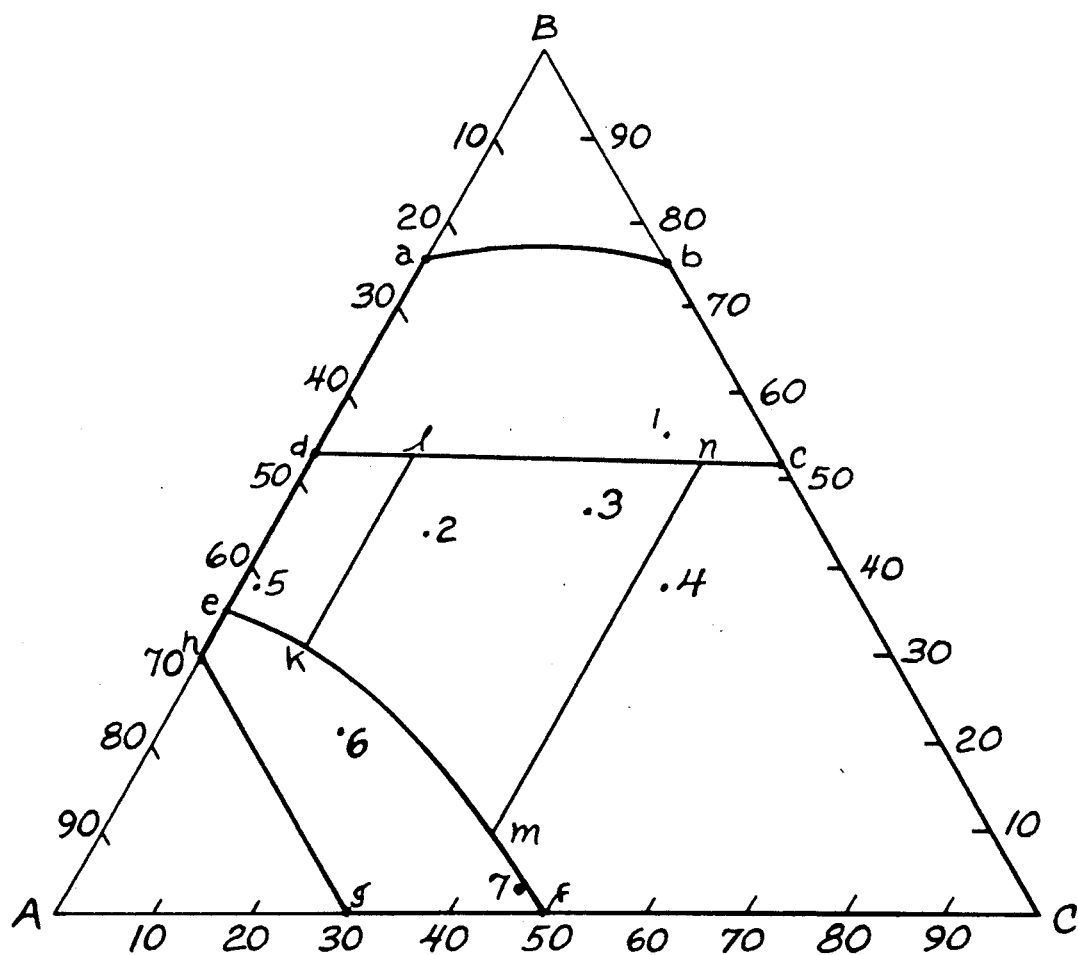
FIG. 1 is a ternary composition diagram (based upon weight percents) giving the preferred compositions of components A, B and C useful in the process of this invention.

A number of waste materials contain metals or metal oxides, as well as some non-metallic oxides. The following is a description of various waste streams which are capable of generating reasonably low melting material suitable for use in the practice of this invention.

Municipal Incinerator Bottom Ash. This represents the solid residues from the combustion of municipal garbage which is sometimes unsorted and increasingly sorted to separate glass, newspaper, plastics and metal. While exceedingly variable in composition, this ash contains sodium and potassium salts, lime, silica, phosphates, alumina, iron oxides or metal, etc. There is also sludge from the air pollution control system which has most of these ingredients plus a great deal of uncombusted carbon particulates.

Hazardous Wastes Incinerator Bottom Ash. There is no real way to define the compositions of hazardous waste incinerator ash because the input feedstocks represent anything that is classified as hazardous. In general, the components of municipal incinerator ash are to be found in the published literature but the proportions vary widely. The oxides of nickel, chromium, aluminum, magnesium, titanium and lead are to be found in the various daily outputs from the incinerator.

Bachouse or Precipitator Dust. Solid residues from thermal processes such as incineration are divided into the bottom ash and the dust; the latter being caught in the baghouse or electrostatic precipitator. There are some differences in composition between the two because of the differences in vapor pressures of entities in the wastes or produced from the wastes. The oxides of zinc, cadmium and lead are found in the dust in disproportionate amounts. Considerable amounts of silica exist because in a reducing atmosphere, the volatile SiO compound exists in a strongly reducing and high temperature environment.

Steel Plant Dust. This consists predominantly of iron oxide fume particulates from electric arc melting furnaces and basic oxygen furnaces. There are commonly present significant quantities of zinc, lead and cadmium oxides; less commonly chromium oxides. Because of the zinc, lead and cadmium oxides, this iron-rich material cannot be recycled to the blast furnace and is classified as a hazardous waste.

Electroplating Sludges. These contain solid hydroxides recovered from spent plating tank solutions and wash waters by adjustment of pH. They are collected in a filter press as a mud-like substance. All metals which are electroplated can be precipitated from aqueous solutions. Metal hydroxides are converted to corresponding oxides at temperatures lower than 500° C.

Electrochemical Machining Sludges. Aluminum, titanium, nickel and cobalt alloys are commonly machined by local dissolution of the alloy using electrochemical mechanisms. The dissolved metals are precipitated under conditions of high pH in the same manner that electroplating waste solutions produce hydroxide sludges. The filter cakes from both processes are essentially equivalent in their potential for use in the present process.

Waste Foundry Sands. To some extent, foundry sands cannot be reused because of attrition or the presence of excessive amounts of organic binders, and metal particle fines. The organic binders contain polymeric entities which combust to hazardous gases and the sands are permeated with metal particulates, some of which contain lead or chromium. There are three principal sands in use: silica, olivine and zircon. The latter two are iron-magnesium silicates and zirconium silicates, respectively.

Contaminated Soils. Hazardous waste disposal sites can become so contaminated that the soil is impregnated with the materials stored there. This represents a hazard as much as the waste. The soil can be treated in the same manner as the hazardous waste in a clean-up process. Soils are usually clay-based or sand-based but their chemistry can only be generalized for purposes of the present process.

Dried and Decontaminated Sewage Solids. While such solids are primarily celluloses and often used for fertilizers, their use has been discouraged for vegetable farming because of minor amounts of such toxic materials as cadmium compounds which are leaked into the sewers of metropolitan areas. The cellulose and other organics can be regarded as fuel for a furnace and the oxides formed become components of the solution of oxides.

Cementitious Fixation. Hazardous waste landfill sites are being used to store hazardous solid wastes which are reputed to be proof against the leaching by ground waters by virtue of the substantial admixture with portland cement. We believe that sometime in the future, these deposits will be mandated to be exhumed. They can be rendered harmless by fusion using the formulation procedure presented in this invention.

Coal Combustion Fly Ash. Many coal-burning electric power plants utilize pulverized coal combusted through burners to gases and coal ash which is so fine in particle size that it is carried off with the hot gases and recovered before venting to the atmosphere. While it is not generally hazardous, coal fly ash must be stored in landfill which is rapidly becoming unavailable. The present process would convert it to useful products for construction purposes.

Other waste streams such as inorganic paint pigment residues and spent refractory materials can also be employed.

In the practice of this invention, two or more of the waste streams are combined in such proportions that they will form on heating a composite that becomes molten and pourable below about 1600° C. In order to obtain good mixing of the waste streams, it is preferable that any agglomerated dry waste be crushed or milled until it will pass through a screen having screen openings of about 1 mm. It is also preferable to dry the wet sludges before they are mixed with the dry waste streams.

In the practice of the present invention, combined waste material is heated in a furnace to a temperature sufficient to cause complete fusion of the solids to form a molten and pourable solution of oxides. The molten material is transferred from the furnace and cooled to solidify the product. The resulting material is useful as a fill for road beds. It can also be used as a filler for concrete or asphalt. If the material contains suitable amounts of iron or iron oxides, it can be used as a blast furnace feed.

In one preferred modification of the process, the mixture of waste material is fused in the presence of a reducing agent such as carbon. This causes reduction of certain of the metal oxides in the waste material to convert them to the free metals. Metals such as iron, nickel and copper form a molten layer from which they can be separated by suitable means and recovered for use or reuse.

Metals with higher volatility present in the mixture, such as zinc, cadmium and lead, will separate from the mixture as a fume. In the presence of air, these metals are readily converted to their oxides at the furnace temperature and the oxide fumes can be collected in a suitable air pollution control system. The metals are then separated by known chemical processes and recovered for use.

We have discovered a method that enables us to predict in what proportions the waste streams should be combined. In order to give a composite that becomes molten and pourable below about 1600° C., the components of each waste stream are divided into three broad classifications designated as A, B and C. In this classification, A is the sum of the percentages by weight of the sodium, potassium, calcium, barium, boron and phosphorus compounds in the mixture measured as their oxides, B is the sum of the percentages by weight of the silicon and aluminum compounds in the mixture measured as their oxides, and C is the sum of the percentages by weight of the iron, copper, nickel, cobalt, zinc, lead, titanium, manganese, cadmium, vanadium, arsenic, magnesium, chromium, tin, tantalum, silver and zirconium compounds in the mixture measured as their oxides.

The waste streams are combined in such proportions that the amounts of the combined A, B and C components of the mixture place it within the preferred area in the ternary composition diagram, FIG. 1. Compositions of various actual or synthetic waste streams are listed in Table 1. The calculated amounts of A, B and C components of these same waste streams are given in Table 2.

TABLE 1

COMPOSITIONS OF ACTUAL WASTE STREAMS, PROTOTYPES AND SYNTHETICS
(% By Weight After Ignition)

Mill Scale

99% $Fe_3O_4.FeO$

Wood Ash

82% CaO, 11.8% $K_2O$, 1.7% $P_2O_5$, 1.6% MnO, 1.2% $SiO_2$, 1% MgO, 0.7% FeO

Steel Plant Dust

54% FeO, 18.2% CaO, 10.8% ZnO, 5.6% MnO, 4.9% MgO, 3.4% $SiO_2$, 2.7% $Na_2O$, 0.8% $K_2O$

Hazardous Waste Incinerator Ash 33.5% $SiO_2$, 26.3% FeO, 10.9% CuO, 9.1% ZnO, 8.7% $TiO_2$, 8.4% CaO, 2.9% NiO, 0.2% $Cr_2O_3$ Hazardous Waste Incinerator Baghouse Dust 33.9% $SiO_2$, 18.3% ZnO, 11.6% $P_2O_5$, 10.2% CaO, 10.1% FeO, 7.4% $Na_2O$, 3.3% CuO, 3.3% $TiO_2$, 1.9% NiO Municipal Incinerator Ash (synthetic, carbon omitted)

36.0% $SiO_2$, 18.1% CaO, 16.9% FeO, 10.8% $Al_2O_3$, 3.9% $Na_2O$, 3.0% $TiO_2$, 3.0% ZnO, 2.8% PbO, 1.9% $K_2O$, 1.8% MgO, 1.2% NiO, 1.1% $P_2O_5$

Waste Silica Sand 98.6% $SiO_2$, 1.4% $Al_2O_3$

Dried Sewage Ash (excluding carbon)

37% FeO, 27.5% $SiO_2$, 15.9% $P_2O_5$, 6.6% $Al_2O_3$, 5.9% CaO, 2.9% $CrO_3$, 2.3% $K_2O$, 1.5% $Na_2O$

Olivine Sand 36.9% MgO, 49.6% $SiO_2$, 11.5% $Fe_2O_3$, 2% $Al_2O_3$

Zircon Sand

70% $ZrO_2$, 27.8% $SiO_2$, 1.3% FeO, 0.9% $Na_2O$, 0.4% $TiO_2$

Dried Electrolating Sludges 25.7% ZnO, 19.7% CuO, 19.5% FeO, 11.1% NiO, 10.6% $CrO_3$, 7.7% $Na_2O$, 3.5% CaO, 2.1% $SiO_2$ Portland Cement Fixation of Steel Plant Dust In Landfills Considered to be about 50% cement and 50% steel plant dust as described above. The Portland cement component had the nominal composition of: 65.4% CaO, 22.7% $SiO_2$, 5.0% $Al_2O_3$, 3.8% $Fe_2O_3$, 3.1% MgO Contaminated Soil A mixture of 25.4% local soil with 74.4% of a metal oxide-rich aggregation of oxides or hydroxies. The solid composition was: 68.1% CaO, 21.7% $SiO_2$, 7.4% FeO, 2.8% $Al_2O_3$ after ignition. The metal oxide-rich sludge had the composition: 36.3% ZnO, 22.1% BaO, 11.1% NiO, 10.6% CuO, 10.2% $Cr_2O_3$, 7.0% PbO, 2.0% $AsO_3$, 0.7% CdO Burned Coal Fly Ash 49.6% $SiO_2$, 22.5% $Al_2O_3$, 16.8% FeO, 5.3% CaO, 2.7% $K_2O$, 1.9% $TiO_2$, 0.9% $Na_2O$, 0.7% MgO

TABLE 2

FRACTIONS OF A. B. C. FACTORS IN DIFFERENT WASTE STREAMS
(Multiply by 100 for % by weight)

| Waste Stream | A | B | C |
| --- | --- | --- | --- |
| Wood Ash | 0.955 | 0.012 | 0.033 |
| Foundry Silica Sand | | 1.0 | |
| Olivine Sand | | 0.516 | 0.484 |
| Zircon Sand | 0.009 | 0.278 | 0.717 |
| Steel Plant Dust | 0.217 | 0.034 | 0.753 |
| Municipal Incinerator Ash (Synthetic) | 0.25 | 0.468 | 0.287 |
| Hazardous Incinerator Ash | 0.084 | 0.335 | 0.581 |
| Hazardous Incinerator Ash (Baghouse Dust) | 0.292 | 0.339 | 0.369 |
| Dried Electroplating Sludges | 0.112 | 0.021 | 0.866 |
| Dried Sewage Ash (Excluding Carbon) | 0.256 | 0.341 | 0.399 |
| Portland Cement Type II | 0.654 | 0.277 | 0.069 |
| Contaminated Soil | 0.337 | 0.062 | 0.599 |
| Coal Fly Ash | 0.089 | 0.721 | 0.194 |
| Mill Scale | | | 1.0 |

FIG. 1 of the drawings shows the ternary composition diagram with the designations of 100 percent A, B and C at the vertices. Most mixtures of waste streams having percentage compositions such that the A, B and C components fall within the area enclosed by the lines joining points a, b, C, g and h form composites that become generally molten and pourable below about 1600° C. This area is enclosed by heavy lines in FIG. 1. However, mixtures which have fairly large amounts of the oxides of chromium, zirconium and magnesium tend to be very high melting. In order to obtain solutions of oxides that become molten and pourable below about 1600° C., it is preferred to limit the amount of chromium oxides to no more than about 4% of the mixture. Even less chromium oxide is tolerated if zirconium and/or magnesium oxides are present. Likewise, it is preferred to limit the amount of zirconium oxides to less than about 15% of the mixture. Even less zirconium oxide is tolerated if chromium oxides and/or magnesium oxides are present. Magnesium oxides should comprise less than about 20% of the mixture and, in the case where both calcium and magnesium oxides are present, the combined amounts of these oxides should be less than about 32% of the mixture.

Some waste streams, which have so much B component that their composition falls between the lines a-b and c-d in FIG. 1, may or may not give composites which become molten and pourable below about 1600° C. For this reason, it is more preferable to blend the mixtures in such proportions that their compositions fall at or below the line c-d in FIG. 1. Likewise, mixtures of waste streams which have so much A component that their compositions fall between the lines e-f and g-h in the ternary composition diagram, FIG. 1, may or may not be molten and pourable below 1600° C. For this reason, it is generally more preferable to limit the amount of the A component in the mixture so that the mixture does not fall to the left of the e-f line in the ternary composition diagram. These more preferable compositions will then have percentage compositions such that the amounts of the A, B and C components are within the area enclosed by lines joining points d, c, C, f and e in FIG. 1.

In order for the solution of oxides produced in the process of this invention to become a slag, it is necessary for their C component to be 10% or more. Composition of such mixtures will then fall in the area enclosed by the lines joining the points 1, c, C, f and k in FIG. 1. Even more useful slags are obtained if the C component is at least about 40% of the mixture. Such mixtures will fall within an area enclosed by the lines joining points n, c, C, f and m in FIG. 1.

The preferred areas shown in FIG. 1 were determined by the following general procedure. Components of various waste streams given in Table 1 were ground or milled until they passed through a screen having openings of about 1 mm. Components were then carefully weighed and blended by mechanical agitation to give mixtures with varying amounts of A, B and C components. Approximately 400 grams of the mixture was added to a pre-fired hot plumbago, fireclay or steel crucible and heated in a gas fired furnace until a temperature of about 1450° to 1550° C. was obtained in the melt. The temperature of the melt was measured by an infrared thermometer. The molten solution of oxides was then poured from the crucible into steel molds for collection. The viscosity, homogeneity and general characteristics of the solution of oxides were evaluated.

The method is illustrated by the examples given in Table 3 which use various mixtures of waste streams. The amounts of the A, B and C components of the mixtures given in weight percentages were calculated from the information given in Table 2. The composition of each example is also indicated by a point in FIG. 1. All of the mixtures in these examples become molten and pourable below 1600° C. Many other mixtures were processed in a similar manner. Lines showing the preferred areas were drawn in FIG. 1 based on these experiments.

TABLE 3
MIXED WASTE STREAMS

| Example No. | Composition | Components (%) | | | Melt Temp. (°C.) |
| --- | --- | --- | --- | --- | --- |
| | | A | B | C | |
| 1 | 15% Municipal Incinerator Ash<br>45% Waste Foundry Sand<br>40% Steel Plant Dust | 12 | 53 | 35 | 1501 |
| 2 | 40% Wood Ash<br>20% Steel Plant Dust<br>40% Waste Foundry Sand | 43 | 41 | 16 | 1473 |
| 3 | 15% Wood Ash<br>40% Steel Plant Dust<br>45% Waste Foundry Sand | 23 | 46 | 31 | 1457 |
| 4 | 45% Municipal Incinerator Ash<br>15% Waste Foundry Sand<br>40% Steel Plant Dust | 20 | 37 | 43 | 1567 |
| 5 | 65% Wood Ash<br>35% Waste Foundry Sand | 62 | 36 | 2 | 1505 |
| 6 | 57% Wood Ash<br>18% Waste Foundry Sand<br>25% Steel Plant Dust | 60 | 19 | 21 | 1541 |
| 7 | 40% Wood Ash<br>60% Steel Plant Dust | 51 | 3 | 46 | 1378 |

The areas given in FIG. 1 were developed based on a preferred pouring temperature range of about 1500° C. to 1600° C. The process of this invention can be carried out with certain mixtures of waste streams at temperatures as low as about 1200° C. However, in order to obtain a composite that becomes molten and pourable at such lower temperatures, the permitted ratios of A, B and C components would lie in a much smaller area than found in the preferred areas in FIG. 1.

One method for carrying out the process of this invention on a commercial scale involves the use of an electric arc furnace with immersed carbon electrodes. For reduction of the metal oxides in the mixture to metals, the electric furnace employs a bed of coke floating on top of the solution of oxides.

A preferred method for carrying out the process of this invention involves the use of a modified coke-fired cupola furnace commonly used in the grey iron casting industry. Such a furnace provides the temperatures and heat input needed to produce a steady free flowing solution of oxides. Such a furnace also provides the reducing conditions necessary to recover metals from the waste streams.

Figure 2:
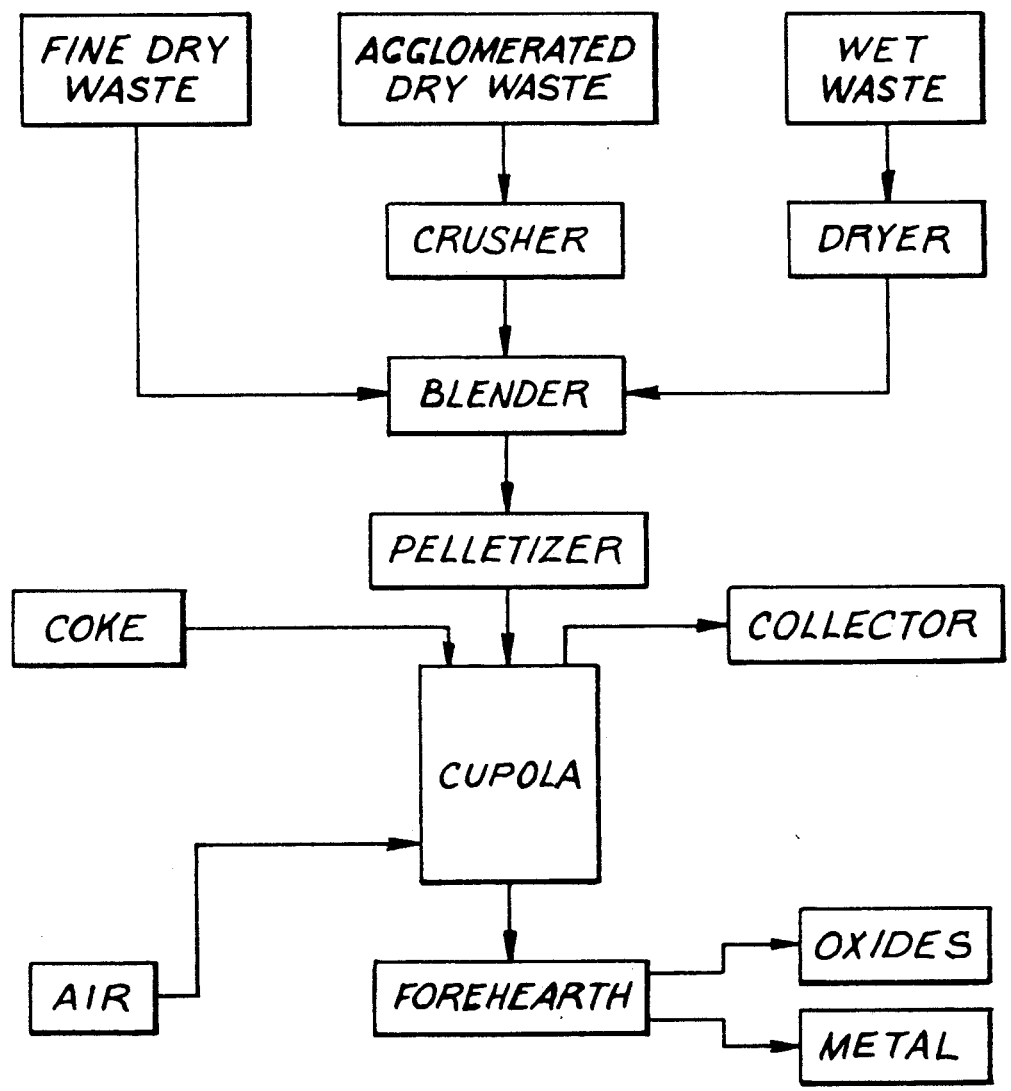
FIG. 2 is a schematic representation of one embodiment of the present invention.

This preferred embodiment of the present invention is schematically depicted in FIG. 2.

A crusher 8 is provided for reducing the particle size of waste streams containing agglomerated solids. Any suitable milling device may be used provided that it can reduce the size of the particles to less than about 1 mm in diameter. Also provided in accordance with this embodiment of the invention is a dryer 10 for drying wet waste material such as electroplating sludges. A blender 12 is provided for blending various streams of waste material that have been dried and crushed. A conduit 13 in communication with the blender is provided for conveying blended waste material to pelletizer 14. Pelletizer 14 in turn is provided with a conduit 18 for conveying the pelletized waste material particles to cupola 16 depicted schematically in FIG. 2. As noted above, this is the type of cupola commonly used in the grey iron casting industry. Near the top of cupola 16 is an opening in communication with conduit 18 through which pelletized waste material can be introduced into the cupola. Also provided near the top of the cupola is an opening in communication with conduit 20 through which coke is introduced to the cupola from a coke storage container 22.

In accordance with the invention, the apparatus includes means for inducing combustion in the cupola to convert the waste material to molten material. As here embodied and depicted in FIG. 2, the combustion inducing means includes the coke source 22 and the oxygen and air source 24. The air and oxygen enters in the lower part of the cupola through one or more conduits 25. In the particular device illustrated in FIG. 2, means 26 communicating with the lower portion of the cupola are provided for transferring the molten material to forehearth 28. Further, in the present embodiment, forehearth 28 contains two outlet conduits 34 and 36. The upper conduit 34 is used to remove a molten solution of oxides from the forehearth, whereas the lower conduit 36 conducts molten metal from the forehearth.

In order to collect fumed metal and metal oxides, as well as gases exiting from the cupola, there is provided a collector 32 shown schematically in FIG. 2 in communication with an outlet duct 30 from the top of the cupola. Collector 32 may include a device such as a bag house or electrostatic precipitator for collecting the solid particulate material and a water scrubber (not shown) to prevent the emission of undesirable gases to the atmosphere.

In using the particular device illustrated, waste streams are first classified into three general groups. The first group comprises finely divided waste 2 having particle sizes less then about 1 mm in diameter. The second group is made up of dry waste streams containing at least some particles of greater than 1 mm in diameter. These are designated in the diagram as agglomerated dry waste 4. A third group consists of wet waste materials designated in the diagram as wet waste 6. Material such a electroplating sludge is in this category. Each of the streams is analyzed to determine its chemical composition. The agglomerated dry waste streams are crushed in the crusher 8 to reduce the particle size to less than about 1 mm in diameter. The wet waste material is dried in dryer 10.

In the next step, the fine dry waste, the agglomerated dry waste which has been crushed and the wet waste which has been dried are blended in blender 12. The various waste streams are blended in such proportions that the amounts of the combined A, B and C components of the mixture place it within the preferred areas in FIG. 1.

Following the blending operation, the material is agglomerated in pelletizer 14 to form pellets or small briquets. It is preferred to have the pellets of approximately the same size as that of the coke used. In carrying out the invention, it may be advantageous to add a binder at this stage in order to increase the strength of the pellets or briquets.

Further, in accordance with the invention, the pelletized material is conveyed through conduit 18 into port near the top of the coke-fired cupola furnace 16. The operating conditions are controlled so that the waste material added to the furnace forms a molten and pourable solution of oxides. Cupola 16 is operated at an average pouring temperature of from about 1200° C. to 1600° C.

In accordance with one preferred embodiment of this invention, the molten mixture formed in the cupola is removed from the cupola through conduit 26 into forehearth 28. Forehearth 28 expedites separation of free metal from the mixture. The metal, which is heavier than the solution of oxides, settles to the bottom and is drawn off through conduit 36 located near the bottom of the forehearth. The solution of oxides which accumulates in the forehearth above the metal overflows and exits from the forehearth through conduit 34 located near the top of the forehearth. The molten metal is either poured into molds or quenched to solidify it. Likewise, the solution of oxides is either poured into molds or quenched. The solidified material is then crushed to the desired size depending on its end use.

In accordance with a further aspect of the invention, the molten material is removed from the cupola 16 through conduit 26. The molten material is either poured into molds or quenched to solidify it. The resulting product contains a mixture of oxides and free metal. It is particularly useful as a feed for mixing with iron ore in a blast furnace when it contains suitable amounts of iron or iron oxides.

In carrying out the invention, gases and particulate matter which pass out of the top of cupola 16 are conducted through outlet duct 30 to collector 32. Collector 32 is so constructed to trap solid material which contains oxides of volatile metals such as zinc, cadmium and lead. These may be recovered and separated for sale. Collector 32 is also constructed to pass effluent gases through a water scrubber to neutralize such gases.

Thus, it is apparent that there has been provided, in accordance with the invention, a process that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit and broad scope of the appended claims and equivalents thereof.

What is claimed is:

1. A method for recovering useful materials from solid streams comprising the steps of:
   (a) mixing a plurality of solid waste streams in such proportions that the amounts of the combined A, B and C components of the mixture are within the area enclosed by lines joining points, a, b, C, g and h in FIG. 1 and that they form a composite that becomes molten and pourable below about 1600° C.;
   (b) heating the mixture obtained in step (a) to a temperature sufficient to cause fusion thereof to form a molten and purable solution of oxides; and
   (c) cooling said solution of oxides to form a stable solid, useful as a filler, wherein A is the sum of the percentages by weight of the sodium, potassium, calcium, barium, boron and phosphorus compounds in the mixture measured as their oxides, wherein B is the sum of the percentages by weight of the silicon and aluminum compounds in the mixture measured as their oxides, and wherein C is the sum of the percentages by weight of the iron, copper, nickel, cobalt, zinc, lead, titanium, manganese, cadmium, vanadium, arsenic, magnesium, chromium, tin, tantalum, silver and zirconium compounds in the mixture measured as their oxides.

2. The method of claim 1 wherein the plurality of waste streams are mixed in such proportions that the amounts of the combined A, B and C components of the mixture are within the area enclosed by lines joining points d, c, C, f and e in FIG. 1 and that they form a composite that becomes molten and pourable below about 1600° C.

3. The method of claim 1 wherein the plurality of waste streams are mixed in such proportions that the amounts of the combined A, B and C components of the mixture are within the area enclosed by lines joining points 1, c, C, f and k in FIG. 1 and that they form a composite that becomes molten and pourable below about 1600° C.

4. The method of claim 1 wherein the plurality of waste streams are mixed in such proportions that the amounts of the combined A, B and C components of the mixture are within the area enclosed by lines joining points n, c, C, f and m in FIG. 1 and that they form a composite that becomes molten and pourable below about 1600° C.

5. The method of claim 1 wherein the waste streams are selected from the group consisting of municipal incinerator bottom ash, hazardous wastes incinerator bottom ash, bag house or precipitator dust, steel plant dust, electroplating sludges, electrochemical machining sludges, waste foundry sands, dried and decontaminated sewage sludge solids, cementitious fixation, coal combustion bottom ash, coal combustion fly ash, inorganic paint pigment residues and spent refractory materials.

6. The method of claim 1 wherein the temperature of step (b) is from about 1200° C. to about 1600° C.

7. The method of claim 1 wherein step (c) is carried out by pouring the solution of oxides into molds.

8. The method of claim 1 wherein step (c) is carried out by quenching the solution of oxides.

9. The method of claim 1 wherein the heating in step (b) is carried out in the presence of a reducing agent to convert metal oxides in the mixture to free metal which is separated from the solution of oxides and recovered.

10. The method of claim 9 wherein the reducing agent is carbon.

11. A method for processing a plurality of solid waste streams of variable composition comprising the steps of:
    (a) analyzing each solid waste stream to determine the amount of its A, B and C components;
    (b) mixing said solid waste streams in such proportions that the amounts of the combined A, B and C components of the mixture are within an area enclosed by lines joining points a, b, C, g and h in FIG. 1 and that they form a composite that becomes molten and pourable below about 1600° C.;
    (c) heating the mixed streams from step (b) to produce a molten and pourable solution of oxides; and
    (d) solidifying the solution of oxides to form a stable solid, useful as a filler, wherein A is the sum of the percentages by weight of the sodium, potassium, calcium, barium, boron and phosphorus compounds in the mixture measured as their oxides, wherein B is the sum of the percentages by weight of the silicon and aluminum compounds in the mixture measured as their oxides, and wherein C is the sum of the percentages by weight of the iron, copper, nickel, cobalt, zinc, lead, titanium, manganese, cadmium, vanadium, arsenic, magnesium, chromium, tin, tantalum, silver and zirconium compounds in the mixture measured as their oxides.

12. The method of claim 11 wherein the plurality of waste streams are mixed in such proportions that the amounts of the combined A, B and C components of the mixture are within the area enclosed by lines joining points d, c, C, f and e in FIG. 1 and that they form a composite that becomes molten and pourable below about 1600° C.

13. The method of claim 11 wherein the plurality of waste streams are mixed in such proportions that the amounts of the combined A, B and C components of the mixture are within the area enclosed by lines joining points 1, c, C, f and k in FIG. 1 and that they form a composite that becomes molten and pourable below about 1600° C.

14. The method of claim 11 wherein the plurality of waste streams are mixed in such proportions that the amounts of the combined A, B and C components of the mixture are within the area enclosed by lines joining points n, c, C, f and m in FIG. 1 and that they form a composite that becomes molten and pourable below about 1600° C.

15. The method of claim 11 wherein the waste streams are selected from the group consisting of municipal incinerator bottom ash, hazardous wastes incinerator bottom ash, bag house or precipitator dust, steel plant dust, electroplating sludges, electrochemical machining sludges, waste foundry sands, dried and decontaminated sewage sludge solids, cementitious fixation, coal combustion bottom ash, coal combustion fly ash, inorganic paint pigment residues and spent refractory materials.

16. The method of claim 11 wherein large particles in said waste streams are comminuted to a size that permits intimate mixing of said waste streams.

17. The method of claim 11 wherein the mixture of step (b) is pelletized before it is heated in step (c).

18. The method of claim 11 wherein the heating step (c) is carried out in a cupola furnace.

19. The method of claim 18 wherein the pouring temperature in the cupola furnace is maintained in the range of from about 1200° C. to about 1600° C.

20. The method of claim 11 wherein the solution of oxides is quenched.

21. The method of claim 18 wherein the molten material produced in the cupola furnace is transferred to a forehearth to separate molten metal from the molten material.

22. The method of claim 18 wherein metal oxides which separate as a fume from the cupola are collected in a collector.

23. An apparatus for processing a plurality of waste streams of variable composition, said apparatus comprising:
- means for blending said waste streams in such proportions that the amounts of the combined A, B and C components of the blended waste stream are within the area enclosed by lines joining points a, b, C, g and h in FIG. 1;
- means for pelletizing said blended waste stream to give a pelletized waste stream;
- means for conveying said pelletized waste stream to a furnace;
- furnace means for heating said pelletized waste stream to a temperature sufficient to melt said pelletized waste stream to convert it to a molten and pourable material; and
- means for conveying said molten and pourable material from said furnace means.

24. The apparatus of claim 23 which further comprises means for reducing particles in said waste streams to particles of less than about 1 mm in diameter.

25. The apparatus of claim 23 which further comprises means for drying wet waste material in said waste streams.

26. The apparatus of claim 23 wherein the furnace is an electric arc furnace.

27. The apparatus of claim 23 wherein the furnace is a cupola furnace.

28. The apparatus of claim 25 wherein the cupola furnace further comprises a forehearth for separating molten metal from molten oxides.

29. The apparatus of claim 23 which further comprises means for collecting fumed metal and metal oxides exiting from said furnace means.

* * * * *